(12) United States Patent
Wu et al.

(10) Patent No.: US 10,347,443 B1
(45) Date of Patent: Jul. 9, 2019

(54) ILLUMINATED KEYBOARD STRUCTURES

(71) Applicant: Apple Inc., Cupertino, CA (US)

(72) Inventors: Chia Chi Wu, Taipei (TW); Paul X. Wang, Cupertino, CA (US); Alex J. Lehmann, Sunnyvale, CA (US); Chien-Tsun Chen, Taipei (TW); Kuo-Chiang Chin, Shenzhen (CN); Ming Gao, Shanghai (CN); Zheng Gao, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/605,390

(22) Filed: May 25, 2017

(51) Int. Cl.
| *H01H 13/83* | (2006.01) |
| *F21V 8/00* | (2006.01) |
| *G06F 3/02* | (2006.01) |

(52) U.S. Cl.
CPC ............ *H01H 13/83* (2013.01); *G02B 6/005* (2013.01); *G02B 6/0023* (2013.01); *G06F 3/0202* (2013.01); *H01H 2219/06* (2013.01); *H01H 2219/062* (2013.01)

(58) Field of Classification Search
CPC ....... H01H 13/70; H01H 13/83; G02B 6/0023
USPC ...................................... 362/23.03
See application file for complete search history.

(56) References Cited

U.S. PATENT DOCUMENTS

| 5,234,744 | A | * | 8/1993 | Kenmochi | ............... | B41J 5/12 |
| | | | | | | 200/310 |
| 6,284,988 | B1 | * | 9/2001 | Watanabe | ............. | G06F 1/1616 |
| | | | | | | 200/314 |
| 6,797,902 | B2 | * | 9/2004 | Farage | ................. | G06F 3/0202 |
| | | | | | | 200/314 |
| 7,172,303 | B2 | * | 2/2007 | Shipman | ............... | G06F 3/0202 |
| | | | | | | 200/314 |
| 7,271,360 | B2 | * | 9/2007 | Kobayashi | ........... | G06F 3/0202 |
| | | | | | | 200/313 |
| 8,785,795 | B2 | | 7/2014 | Zou | | |
| 8,888,305 | B2 | | 11/2014 | Chen | | |
| 8,890,720 | B2 | | 11/2014 | Shipman et al. | | |
| 9,502,191 | B1 | | 11/2016 | Chen | | |
| 2009/0128496 | A1 | * | 5/2009 | Huang | ................. | G06F 3/0202 |
| | | | | | | 345/170 |
| 2010/0123606 | A1 | * | 5/2010 | Nishino | ................ | G06F 3/0202 |
| | | | | | | 341/22 |
| 2012/0012448 | A1 | * | 1/2012 | Pance | .................... | H01H 13/83 |
| | | | | | | 200/5 A |

FOREIGN PATENT DOCUMENTS

CN            201655620         11/2010

* cited by examiner

*Primary Examiner* — Christopher M Raabe
(74) *Attorney, Agent, or Firm* — Dorsey & Whitney LLP

(57) ABSTRACT

Embodiments are directed to a backlight integrated membrane for a keyboard. In one aspect, an embodiment includes a keyboard having a key cap. A feature plate may be positioned below the key cap and a membrane may be positioned below the feature plate. The membrane may include a transparent substrate optically coupled to a light emitting element. The membrane may also include electrical traces for a key switch disposed on the transparent substrate. The embodiment may further include a domed structure positioned on the membrane and configured to actuate the key switch when depressed.

20 Claims, 11 Drawing Sheets

ILLUMINATED KEYBOARD STRUCTURES

FIELD

The described embodiments relate generally to input devices for computing systems. More particularly, the present embodiments relate to structures that facilitate illumination of a keyboard.

BACKGROUND

In computing systems, a keyboard may be employed to receive input from a user. Many traditional keyboards may suffer from significant drawbacks that may affect the visibility of keyboard keys in a dimly-lit environment. In many cases, traditional keyboards include various mechanical and electrical components that may impede illumination of the keyboard.

SUMMARY

Embodiments of the present invention are directed to a backlight integrated membrane circuit for a keyboard.

In a first aspect, the present disclosure includes a key for a keyboard. The key includes a keycap. The key further includes a feature plate positioned below the keycap. The key further includes a membrane positioned below the feature plate. The membrane includes a transparent substrate optically coupled to a light emitting element. The membrane further includes electrical traces for a key switch disposed on the transparent substrate. The key further includes a domed structure positioned on the membrane and configured to actuate the key switch when depressed.

A number of feature refinements and additional features are applicable in the first aspect and contemplated in light of the present disclosure. These feature refinements and additional features may be used individually or in any combination. As such, each of the following features that will be discussed may be, but are not required to be, used with any other feature combination of the first aspect.

For example, in an embodiment, the transparent substrate defines a light guide configured to receive light from the light emitting element. The transparent substrate may be further configured to emit light received from the light emitting element toward an illuminable portion of the key cap. In some cases, the domed structure may include a transparent material. The domed structure may be configured to receive light from the transparent substrate. Subsequently, the domed structure may be further configured to emit light received from the transparent substrate toward the illuminable portion of the key cap. This may cause the illuminable portion of the key cap to illuminate.

In another embodiment, the key may further include a support structure positioned below the key cap. The feature plate may include a set of engagement features. In this regard, the support structure may be coupled to the set of engagement features and an underside of the key cap to provide support to the key cap. Additional or alternatively, the feature plate includes a hole. The domed structure may extend through the hole. In some cases, the periphery of the domed structure may be positioned within the hole. Additionally or alternatively, a thickness of the periphery of the domed structure may be greater than a thickness of the feature plate.

In another embodiment, the light emitting element may be positioned on a lateral surface of the transparent substrate. The membrane may include a through portion positioned under the domed structure. The through portion may be configured to vent an interior volume of the domed structure. In some cases, a thermal bonding film is directly adhered to the feature plate and the membrane.

In this regard, a second aspect of the present disclosure includes a key for a keyboard. The key includes a key cap. The key includes a dome integrated switch housing positioned below the key cap. The dome integrated switch housing includes a domed structure. The dome integrated switch housing further includes a switch housing overmolded over a periphery of the domed structure. The key further includes a backlight integrated membrane positioned under the dome integrated switch housing. The backlight integrated membrane includes a circuit layer having light conductive properties.

A number of feature refinements and additional features are applicable in the second aspect and contemplated in light of the present disclosure. These feature refinements and additional features may be used individually or in any combination. As such, each of the following features that will be discussed may be, but are not required to be, used with any other feature combination of the second aspect.

For example, in an embodiment, the backlight integrated membrane further includes a light emitting element optically coupled with the circuit layer. The backlight integrated membrane may be configured to propagate light received from the light emitting element to an illuminable portion of the key cap. To facilitate the foregoing, in some cases, the dome integrated switch housing includes light extraction features that receive light from at least one of: (i) the backlight integrated membrane; or (ii) the light emitting element. As such, the dome integrated switch housing may be configured to illuminate an illuminable portion of the key cap using light received at the light extraction feature. The key may further include a reflector directly adhered to a bottom surface of the backlight integrated membrane.

In another embodiment, an upper portion of the domed structure may be configured to deform in response to an input force exerted on the key cap. The periphery of the domed structure may define a collar. The collar may be configured to resist deformation of the upper portion once the upper portion impacts the collar. The electrical traces may be configured to detect a first deformation of the rubber dome. In this regard, the key may further include a sensing element configured to detect a second deformation of the domed structure.

In another embodiment, the overmolded switch housing may have a hardness that is greater than a hardness of the domed structure. In some cases, the switch housing may define a securement feature that engages the backlight integrated membrane.

In this regard, a third aspect of the present disclosure includes an input structure for an electronic device. The input structure includes a membrane assembly defining a key switch for a keyboard key. The membrane assembly includes a light emitting element. The membrane assembly further includes a pair of layers at least partially surrounding the light emitting element and having electrical traces connected to the key switch. The input structure further includes a collapsible dome positioned on the membrane assembly. The input structure further includes a key cap positioned above the collapsible dome and having an illuminable portion. One of the pair of layers defines a light guide configured to direct light toward the illuminable portion of the key cap.

A number of feature refinements and additional features are applicable in the third aspect and contemplated in light of the present disclosure. These feature refinements and additional features may be used individually or in any combination. As such, each of the following features that will be discussed may be, but are not required to be, used with any other feature combination of the third aspect.

For example, in an embodiment, the membrane assembly may further include an optical adhesive positioned between the light emitting element and the light guide. The optical adhesive may be configured to couple the light emitting element and the light guide. The input structure may further include a switch housing overmolded over a portion of the collapsible dome and defining a series of illumination features configured to optically couple with the light guide. The light guide may direct light toward the illuminable portion of the input structure using the illumination features.

In another embodiment, the input structure may further include a feature plate and a scissor mechanism pivotally coupled with the feature plate and the key cap. In this regard, the collapsible dome may be overmolded over one of: (i) the feature plate; or (ii) the scissor mechanism.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like elements.

Figure 1A:
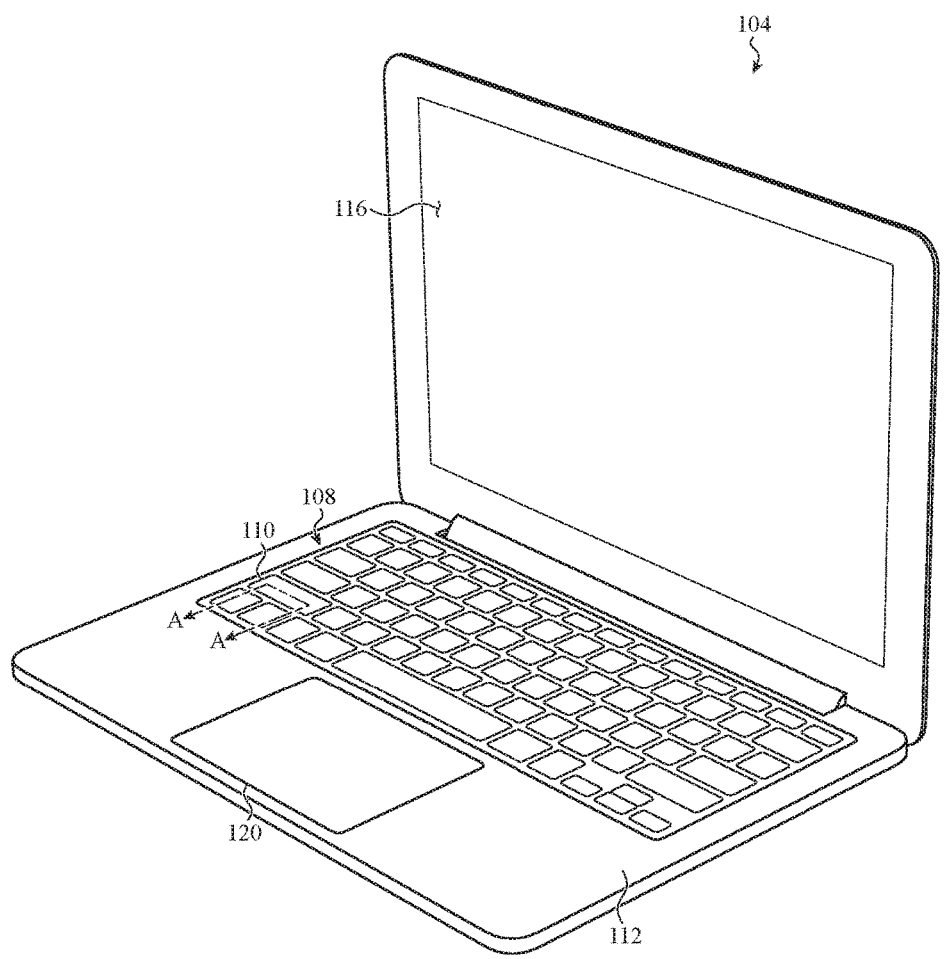
FIG. 1A depicts a sample electronic device including a keyboard.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to a keyboard assembly or other input mechanism and, more particularly, to various illumination structures that illuminate one or more keys of a keyboard (or input surfaces of another input mechanism). An illumination structure may include a backlight integrated membrane, or other transparent, or partially transparent, portion of the keyboard assembly stack-up that includes electrical traces of a key switch. A light emitting element, such as a light emitting diode, may be positioned on, within, partially surrounded by, and/or be a portion of, the backlight integrated membrane, although in some embodiments the light emitting element may be separate from the backlight integrated membrane. The backlight integrated membrane may define a transparent substrate or light guide that directs light from the light emitting element to an illuminable portion of a keyboard key or other input surface. In some cases, the transparent substrate may at least partially surround the light emitting element. This may allow the backlight integrated membrane to be configured to both transmit a signal in response to actuation of the keyboard key (via the electrical traces of the key switch) and illuminate an illuminable portion of the key. For example, when the domed structure collapses, it may form an electrical connection between parts of the electrical traces, thereby generating an input signal. The electrical traces may transmit this signal to a processing unit or other element of an electronic device, thereby registering an input force as an input to the electronic device.

As used herein, the phrase "illuminable portion of a key" refers generally to any or all areas of (or adjacent to) a keycap or other input surface of a key that is intended to be illuminated by the light emitting element such that the location, size, and/or functionality of the key, or portion of the key, is visually emphasized. For example, a key may include a symbol or a glyph that defines an alphanumeric character, a punctuation mark, a word, an abbreviation, or any other linguistic, scientific, numeric, or pictographic symbol or set of symbols. The geometry of the key may also be an illuminable portion of the key, for example, such as a surface of the key defining a perimeter, a sidewall, a corner, and so on.

To facilitate the foregoing, light emitting element may be connected to, and/or partially surrounded by, the transparent substrate (e.g., light guide) of the backlight integrated membrane. Further, the transparent and/or internally reflective substrate may define signal-transmitting electrical traces, or these traces may be positioned on a surface of the substrate. The electrical traces may generate an input signal when connected. By integrating the light emitting element with the transparent substrate as described herein, the overall size and/or thickness of the stack-up for the keyboard assembly, or other input mechanism, may be reduced. Further, this may allow a surface area of the backlight integrated membrane to be increased, which may enhance the ability to route electrical traces and switch circuitry (such as a key switch) in or over the backlight integrated membrane. For example, because the backlight integrated membrane defines the light guide, the backlight integrated membrane may lack various holes and openings that would otherwise be used to allow light to pass through the backlight integrated membrane. The backlight integrated membrane may be implemented, secured, and/or installed in a variety of positions and configurations within the stack-up (e.g., below the feature plate, contacting a switch housing, or the like, as described herein), which may further reduce the stack-up size and/or enhance the versatility of the backlight integrated membrane within the stack-up.

To illustrate, in an embodiment, the backlight integrated membrane may be positioned within the keyboard stack-up below a feature plate. For example, the backlight integrated membrane may be directly adhered to a bottom surface of the feature plate via a thermal bonding film. The feature plate may be a structural portion of the stack-up that defines various engagement features at which a support structure of the key cap (e.g., a scissor mechanism, a butterfly mechanism, or the like) may be attached. A tactile or collapsible dome, such as a rubber, elastomeric, or otherwise deformable dome, may be positioned directly on a surface of the backlight integrated membrane and extend through a hole or opening of the feature plate and towards the key cap. By attaching the backlight integrated membrane to the bottom or lower surface of the feature plate, the overall height or thickness of the keyboard (or other suitable input mechanism) may be reduced. In particular, a portion of the height of the dome may overlap with the thickness or height of the feature plate, which may reduce the overall thickness of the keyboard stack.

Furthermore, by combining the light transmitting layer with the electrical conductive layer that forms part of the keyboard/input switch, the overall height of the keyboard stack/input mechanism may be further reduced. The light-transmitting layer may be used to deliver light to each key assembly, which may transmit the light to the underside of the key cap. In one embodiment, the backlight integrated membrane may aid in lighting the illuminable portion of the key via the domed structure, which may be constructed from a fully or partially transparent material. Thus, light may pass from the light emitting element, to the transparent substrate (which may least partially surround the light emitting element), through the transparent material of the domed structure above the membrane, and to an illuminable portion of a key cap positioned above the domed structure. In other cases, other components of the stack-up, positioned above or extending through the feature plate, may be used with the backlight integrated membrane to light an illuminable portion of the key or key cap.

In another embodiment, the backlight integrated membrane may be directly coupled with a dome integrated switch housing that may direct light to the illuminable portion of the key or key cap. In particular, the backlight integrated membrane may be coupled with an overmolded switch housing that is overmolded over a tactile or collapsible dome. The overmolded switch housing and domed structure may collectively define the dome integrated switch housing, which may form a structural component of the stack-up that is also used to detect actuation of the key or key cap. The overmolded switch housing and/or domed structure may include various light extraction features and/or other illumination features that receive light from the backlight integrated membrane, which may be subsequently directed to the illuminable portion of the key or key cap.

As described herein, the dome integrated switch housing may include or define various features that may decrease stress and strain on the domed structure over time. For example, a collar, reinforcement member, or other structure integrally formed with the switch housing or domed structure may extend around a perimeter of the domed structure and impede or resist deformation of various portions of the domed structure. Additionally or alternatively, the overmolded switch housing and/or domed structure may include various sensing elements that augment or support the electrical traces connected to the key switch defined within the backlight integrated membrane. For example, a sensing element (e.g., a capacitive-based sensor, a contact-based sensor, or any other appropriate sensor) may be coupled to, or defined by, a portion of the overmolded switch housing and/or the domed structure and configured to detect a range of deformations of the domed structure. The electrical traces may transmit an input signal to a processing unit or other element of an electronic device in response to the sensing element detecting deformation (or collapse) of the domed structure. That is, the deformation of the dome may connect the electrical traces by closing the key switch, thereby generating and/or providing a signal path for an input signal.

It will be appreciated that the backlight integrated membrane may be constructed, configured, and/or arranged in a variety of manners, as described herein. In some cases, the backlight integrated membrane may be a single transparent substrate optically coupled with a light emitting element, or even partially surrounding the light emitting element. In other cases, the backlight integrated membrane may include two, three, or more layers as may be appropriate for a given application. In still other embodiments, the backlight integrated membrane may include the transparent substrate formed by one or more layers and an integrated, or partially or fully surrounded, light emitting element. In a particular embodiment, the backlight integrated membrane may include a pair of sensing layers at least partially surrounding a light source and having electrical traces of a key switch positioned on each layer. One or more of the layers may define a light guide, formed as a transparent substrate, which is configured to direct light toward the illuminable portion of the key. The light emitting element may be optically coupled to the one or more layers of the backlight integrated membrane using any appropriate techniques, including via an optical filler that bonds the light emitting element to a given layer or portion of the transparent substrate. In some cases, the optical filler may reduce undesirable light reflection and refraction within the backlight integrated membrane.

It should be appreciated that certain embodiments may take the form of an input structure other than a key of a keyboard. For example, a mouse button, trackpad, stand-alone button, or the like may all incorporate embodiments disclosed herein. Thus, as one non-limiting example, an input button may replace a key in some embodiments, just as an input surface of such a button may replace a key cap.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1A depicts an example electronic device 104 having a keyboard assembly 108, although other input mechanisms may incorporate embodiments discussed herein. Each key of the keyboard assembly 108 may include a "stack-up" of layer components that cooperate to initiate an input signal in response to a force input. The keyboard assembly 108 may include one or more backlight integrated membranes, such as the backlight integrated membrane as discussed above and described in greater detail below. As described herein, the backlight integrated membrane may be configured to detect actuation of a keyboard key (e.g., via electrical traces, terminals, tabs, and/or other elements that may function as, or with, a key switch and that are positioned on or within the backlight integrated membrane) and aid in lighting an illuminable portion of the keyboard key.

In a non-limiting example, as shown in FIG. 1A, the electronic device 104 may be a laptop computer. However, it is understood that electronic device 104 may be any suitable device that operates with the keyboard assembly 108 (or any other suitable device or input mechanism configured to receive a touch and/or force input from a user). Some example electronic devices may include data-entry devices, word-processing devices, desktop computers, notebook computers (as shown in FIG. 1A), smart phones, tablets, portable media players, or the like. Other examples of electronic devices may include health monitoring devices (including pedometers, heart rate monitors, or the like), and other electronic devices, including digital cameras, printers, scanners, security systems or devices, or electronics for automobiles, among other electronic devices. Suitable input mechanisms may include trackpads, mice, joystick, buttons, and so on.

For purposes of illustration, FIG. 1A depicts the electronic device 104 as including the keyboard assembly 108, an enclosure 112, a display 116, and one or more input/output members 120. It should be noted that the electronic device 104 may also include various other components, such as one or more ports (e.g., a charging port, a data transfer port, or the like), communications elements, additional input/output members (including buttons), and so on. As such, the discussion of any computing device, such as the electronic device 104, is meant as illustrative only.

The keyboard assembly 108 may be positioned within the electronic device 104. In a non-limiting example shown in FIG. 1A, the keyboard assembly 108 may include a set of illuminable keys 110. Each of the set of illuminable keys 110 may have an illuminable portion, as described above, at which light from a light emitting element may visually emphasize a location, size, and/or functionality of the key. The set of illuminable keys 110 may be substantially surrounded by, and at least partially protrude from, the enclosure 112. The set of illuminable keys 110 may be configured to receive a force input. The force input may depress a particular one of the set of illuminable keys 110 to trigger one or more input signals that may control the electronic device 104. As depicted, the keyboard assembly 108 may be positioned within the electronic device 104. In other embodiments, the keyboard assembly 108 may be a distinct, standalone component communicatively coupled with the electronic device 104 via a wireless or hardwired connection.

Figure 1B:
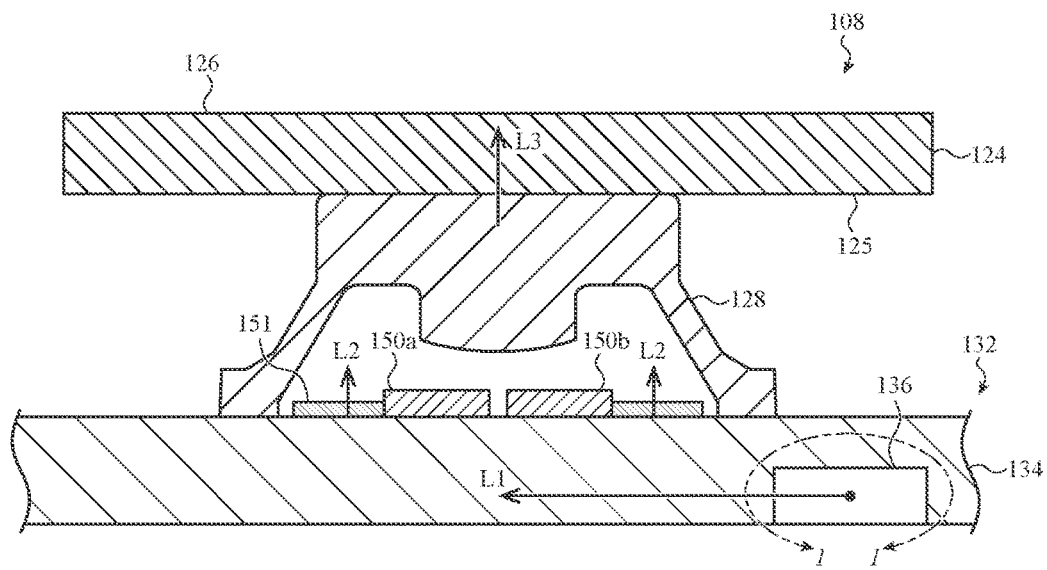
FIG. 1B depicts a cross-sectional view of the embodiment of the user input device of FIG. 1A, taken along line A-A of FIG. 1A.

FIG. 1B is a cross-sectional view of the keyboard assembly 108 of FIG. 1A, taken along line A-A of FIG. 1A. As illustrated, the keyboard assembly 108 includes a key cap 124 (e.g., such as one of the set of illuminable keys 110 discussed above), a domed structure 128, and a backlight integrated membrane 132. The key cap 124 may define an input surface of the keyboard assembly 108 and is similar to other possible input surfaces such as mouse buttons, trackpads, joystick buttons, standalone buttons, and so on. For example, the key cap 124 may be configured to receive a force input to actuate one or more switches of the keyboard assembly 108. The key cap 124 may include an illuminable portion (e.g., glyph, symbol, sign and/or geometric features, including surfaces, perimeters, sidewalls, corners, and so on) that is intended or configured to be illuminated by a light emitting element of the keyboard assembly 108. As shown in FIG. 1B, the key cap 124 includes an illuminable surface 126.

The key cap 124, or other input surface, may be positioned over the domed structure 128. The domed structure 128 may be any appropriate collapsible dome or elastically deformable structure configured to buckle in response to an applied force. For example, the domed structure 128 may be formed from any sufficiently elastic and resilient material (e.g., rubber, silicone, metal, or the like) such that it does not necessarily permanently deform in response to an applied force resulting from motion of the key cap 124 in response to an input. Put another way, the domed structure 128 may substantially return to an original or undeformed shape after an input ceases. In this regard, the key cap 124 may deform the domed structure 128 in response to a user input, such as a force, received at the key cap 124. This deformation and/or collapse of the domed structure may electrically connect a set of terminals positioned on (or forming part of) the backlight integrated membrane, thereby generating an input signal. To facilitate the foregoing, a support structure, such as a scissor mechanism, butterfly mechanism, and so on may support the key cap 124 above the domed structure 128 and/or guide movements of the key cap 124 when the key cap 124 impacts the domed structure 128.

The domed structure 128 may be positioned on the backlight integrated membrane 132. The backlight integrated membrane 132 may be a sensing membrane that defines a keyboard membrane circuit or circuit layer used to detect an actuation of the key cap 124. In this regard, the backlight integrated membrane 132 may include various electrical traces, such as electrical traces 151 shown in FIG. 1B, that define a circuit layer and which may be used to transmit an input signal caused by a depression or collapse of the domed structure 128 in response to force exerted on the key cap. For example, the domed structure 128 may include a conductive bottom surface that completes a circuit between terminals on the backlight integrated membrane. The backlight integrated membrane 132 may also be a substantially transparent component that guides or directs light through the keyboard assembly 108 (e.g., to the domed structure 128, the key cap 124, and so on), for example to an illuminable surface of the key cap. Accordingly, the backlight integrated membrane 132 may: 1) include a circuit layer having light conductive properties that both generates an input signal in response to collapse of the domed structure 128 due to force exerted on the key cap 124; and 2) aid in providing light to illuminable portions of the key cap 124.

In the embodiment of FIG. 1B, the backlight integrated membrane 132 may be or include a transparent substrate 134. The transparent substrate 134 may be constructed from any appropriate material that allows light to propagate or pass through a thickness, length, or other dimension of the material. Sample materials include polyethylene terephthalate (PET), acrylic, silicone, or the like. In other cases, other materials are contemplated, including embodiments in which a combination of materials may be used to construct the transparent substrate 134. The transparent substrate 134 may also include various optical properties that allow the transparent substrate 134 to direct light toward various portions of the keyboard assembly 108 (e.g., such as toward an illuminable portion of the key cap 124). Electrical traces and/or one or more light sources may be attached to, or integrated within, the transparent substrate 134 to form the backlight integrated membrane 132.

As shown in FIG. 1B, the backlight integrated membrane 132 includes terminals 150a, 150b. As shown, the terminals 150a, 150b as deposited on, or form part of, a surface of the transparent substrate 134. In other cases, the terminals 150a, 150b may be positioned at least partially within the transparent substrate 134. The terminals, taken together, form a key switch. The key switch terminals 150a, 150b may form part of a keyboard membrane circuit layer that is configured to detect actuation of the key cap 124. For example, the terminals 150a, 150b may be electrically connected by an underside of the domed structure 12, when the domed structure collapses. In this regard, the underside of the domed structure 128 may be a conductive surface that electrically connects the terminals 150a, 150b of the key switch when the dome collapses. In one embodiment, the collapsing dome may be used to generate an input signal by electrically connecting the terminals 150a, 150b.

The terminals 150a, 150b may be electrically connected to the electrical traces 151. In this regard, the terminals 150a, 150b may provide a key-specific electrical signal (e.g., input) to the electronic device 104, transmitted through the electrical traces 151, when the key cap 124 is actuated and the domed structure 128 collapses to electrically connect the terminals. It will be appreciated that in other embodiments, other combinations, orientations, and/or arrangements of terminals 150a, 150b, or other electrical traces or sensors, are contemplated.

Generally, force exerted on the key cap 124 may cause the key cap to move toward the backlight integrated membrane 132. The key cap's motion may fully or partially deform or collapse the domed structure 128. This collapse may bridge or otherwise electrically connect the terminals 150a, 150b, thereby generating a corresponding input signal. The input signal may be transmitted along the electrical traces 151 electrically connected to the terminals, for example.

The key switch terminals 150a, 150b, electrically connected electrical traces 151, and/or any other components or sensors of the backlight integrated membrane 132 may be constructed from any appropriate material configured to complete an electrical circuit. In some cases, the terminals 150a, 150b may be constructed from one or more of copper, carbon, and/or indium tin oxide, however, in other embodiments, other materials are contemplated. The terminals 150a, 150b may be formed on the transparent substrate 134 in various manners to produce the circuit layer of the backlight integrated membrane 132. For example, the key switch terminals 150a, 150b may be arranged on the transparent substrate 134 via deposition, sputtering, printing, or other appropriate process.

The backlight integrated membrane 132 may also include, or be coupled with, a light emitting element 136. The light emitting element 136 may be a light emitting diode ("LED") or other appropriate component configured to emit light into the keyboard assembly 108. Light emitted by the light emitting element 136 may be used by various components of the keyboard assembly 108 to light an illuminable portion of the key cap 124.

As shown in FIG. 1B, a transparent substrate of the backlight integrated membrane 132 includes and/or at least partially surrounds the light emitting element 136. The light emitting element may be positioned within an interior volume of the transparent substrate 134. This may allow light emitted from the light emitting element 136 to transmit or propagate into the transparent substrate 134. Put another way, the backlight integrated membrane directs light from the light emitting element. In other cases, as described in greater detail below, the light emitting element 136 may be positioned and/or secured on an outer surface of one or more layers (e.g., transparent substrate 134) of backlight integrated membrane 132. The light emitting element 136 may be directly attached to, or integrated within, the transparent substrate 134 using an optical adhesive, glue or other optically transparent interstitial layer that may bond the light emitting element 136 and the backlight integrated membrane 132 and so that the backlight integrated membrane may redirect light from the light emitting element to illuminate a key cap or other input surface.

The backlight integrated membrane 132 may be configured to propagate, transmit or otherwise direct light to an illuminable portion of the key cap 124. For example, the transparent substrate 134 of the backlight integrated membrane 132 may be a structure that spans an entire dimension of the key cap 124 (or the entire dimension of the set of keys 110), or at least a portion of a key cap dimension. The transparent substrate 134 may thus receive light from the light emitting element 136 at a first location and transmit or propagate the received light to a second location with the keyboard assembly 108. This may allow the backlight integrated membrane 132 to aid in providing light to illuminable portions of the key cap 124. To illustrate, as shown in FIG. 1, the transparent substrate 134 may receive light from the light emitting element 136 along light path L1. The transparent substrate 134 may propagate light to a region of the keyboard assembly 108 positioned directly below the key cap 124 and/or the domed structure 128, thereby causing an illuminable portion of the key cap 124 to illuminate. By way of particular example, the transparent substrate 134 of the membrane may emit light along light path L2, which may cause light from the light emitting element 136 to travel toward an underside surface 125 of the key cap 124 such that the illuminable surface 126 illuminates. Put another way, the backlight integrated membrane may direct light to illuminate the illuminable surface 126 of the key cap 124.

Additionally or alternatively, the transparent substrate 134 may propagate light into and through the domed structure 128 along light path L2, which may also cause an illuminable portion of the key cap 124 to illuminate. For example, the domed structure 128 may be a transparent structure optically coupled with the transparent substrate 134. In turn, the domed structure 128 may be configured to emit light along light path L3, which may cause light to travel through or across the underside surface 125 of the key cap 124 to illuminate the illuminable surface 126.

It will be appreciated that the light paths L1, L2, L3 are depicted for purposes of illustration only. Rather than suggest that the light travels exclusively along a particular light path, the illustrated light paths are depicted to be a representation of the diffuse light that propagates with the keyboard assembly 108.

Figure 1C:
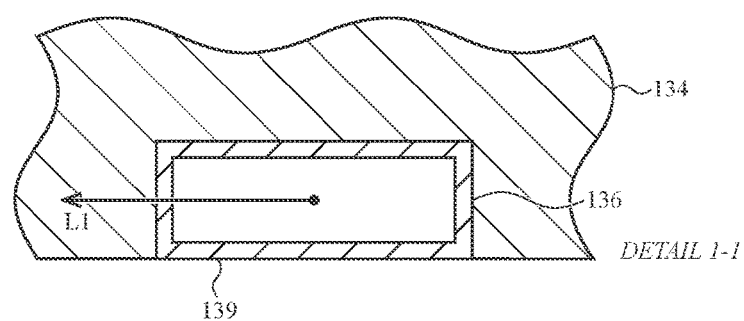
FIG. 1C depicts an enlarged view of a backlight integrated membrane of the user input device of FIG. 1B.

FIG. 1C depicts detail 1-1 of the backlight integrated membrane 132 depicted in FIG. 1A. As shown in the non-limiting example of FIG. 1C, the backlight integrated membrane 132 may include an optical filler 139. The optical filler 139 may be ultraviolet (UV) glue or another optical adhesive. The optical filler 139 may be used to optically couple (e.g., bond) the light emitting element 136 to the transparent substrate 134 and/or other components of the keyboard assembly 108. For example, as shown in FIG. 1C, the optical filler 139 may be positioned between the light emitting element 136 and the transparent substrate 134 to secure the light emitting element 136 to the transparent substrate 134 within the backlight integrated membrane 132.

The optical filler 139 may also be used to optically couple the light emitting element 136 and the transparent substrate 134. In particular, the optical filler 139 may be configured to reduce light reflection and refraction between the light emitting element 136 and the transparent substrate 134. For example, the light emitting element 136 and the transparent substrate 134 may each exhibit different indices of refraction. As such, light transmitted between the light emitting element 136 and the transparent substrate 134 may tend to reflect and/or refract across a boundary or interface between the light emitting element 136 and the transparent substrate 134. In this regard, the optical filler 139 may be positioned along an interface between the light emitting element 136 and the transparent substrate 134 to reduce such effects. For example, the optical filler 139 may have an index of refraction that is substantially between that of the transparent substrate and the light emitting element 136. Accordingly, the change in the index of refraction experienced by the light may not be as abrupt. This may enhance the ability of the transparent substrate 134 to receive light from the light emitting element 136. As shown in FIG. 1C, the light emitting element 136 may emit light along light path L1 that travels into the transparent substrate 134 without substantially experiencing undesirable reflection or refraction.

Figure 1D:
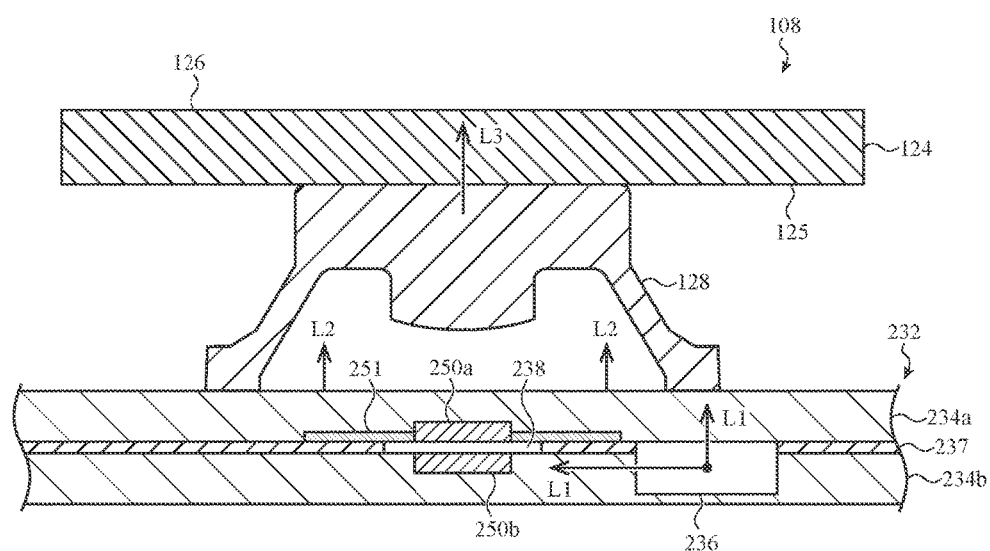
FIG. 1D depicts a cross-sectional view of another embodiment of a backlight integrated membrane of the user input device of FIG. 1A, taken along line A-A of FIG. 1A.

FIG. 1D depicts a cross-sectional view of another embodiment of the keyboard assembly 108 of FIG. 1A, taken along line A-A of FIG. 1A. As illustrated, FIG. 1D depicts the key cap 124, the domed structure 128, and a backlight integrated membrane 232. The backlight integrated membrane 232 includes a stack-up of multiple sheets, films, or the like that cooperate to define a keyboard membrane circuit layer that completes an electrical path upon an actuation of the key cap 124, thereby generating an input signal for an electronic device. One or more of the multiple sheets may be a transparent component that may aid in providing light to an illuminable portion of the key cap 124, such as illuminable surface 126. Accordingly, substantially analogous to the backlight integrated membrane 132 described with respect to FIG. 1B, the backlight integrated membrane 232, described with respect to FIG. 1D, may be a single integrated component that both detects actuation of the key cap 124 and aids in providing light to illuminable portions of the key cap 124. In this regard, analogous to the components described in relation to the embodiments of FIG. 1B, the backlight integrated membrane 232 may include terminals 250a, 250b, electrical traces 251, and light emitting element 236. The terminals 250a, 250b may collectively form a key switch.

Notwithstanding the foregoing, the backlight integrated membrane 232 may include a transparent substrate that is defined by multiple, separated layers. For example, as illustrated in the embodiment of FIG. 1D, the backlight integrated membrane 232 may include a top sheet 234a and a bottom sheet 234b. One or both of the top sheet 234a and/or the bottom sheet 234b may be a substantially transparent component configured to transmit or propagate light. The top sheet 234a and the bottom sheet 234b may be separated by a membrane spacer 237. The top sheet 234a and the bottom sheet 234b may be directly adhered or coupled with opposing surfaces of the membrane spacer 237. The membrane spacer 237 may include hole 238. The top sheet 234a and the bottom sheet 234b may be configured to deform or otherwise extend into the hole 238 (and toward one another) in response to an applied force (e.g., caused by an actuation of the key cap 124).

The terminal 250a may be positioned within, and form an external surface of, the top sheet 234a. The terminal 250b may be positioned within, and form an external surface of, the bottom sheet 234b. As shown in FIG. 1D, the terminals 250a, 250b may be spaced apart from one another within the hole 238 when the backlight integrated membrane 232 is in an uncompressed state. Upon actuation of the key cap 124, the top and bottom sheets 234a, 234b may deflect and cause the terminals 250a, 250b to move toward one another and close the key switch. This may complete an electrical connection that is used by the keyboard assembly 108 to generate an input signal.

In the embodiment of FIG. 1D, the backlight integrated membrane 232 includes the light emitting element 236. The light emitting element 236 may be arranged in any appropriate position or orientation within the backlight integrated membrane 232 such that the light emitting element 236 is optically coupled with one or both of the top sheet 234a or the bottom sheet 234b. As such, one or both of the top sheet 234a or the bottom sheet 234b may be a substantially transparent component configured to guide or propagate light to aid in lighting an illuminable portion of the key cap 124. In a particular configuration, as shown in FIG. 1D, the light emitting element 236 may be positioned on a surface of the top sheet 234a and extend through the membrane spacer 237 and at least partially into a volume defined by the bottom sheet 234b. It will be appreciated that other configurations are contemplated, including configurations in which the light emitting element 236 is positioned at least partially within a volume of the top sheet 234a and the bottom sheet 234b.

As shown in FIG. 1D, the light emitting element 236 may emit light into the keyboard assembly 108 to illuminate an illuminable portion of the key cap 124, such as illuminable surface 126. In particular, the light emitting element 236 may emit light into one or both of the top or bottom sheets 134a, 134b, for example, substantially along light path L1. The top sheet 134a and/or the bottom sheet 134b may receive light from the light emitting element 236 and transfer or propagate the received light to another location or region of the keyboard assembly 108 to facilitate illuminating the key cap 124. For example, as shown in FIG. 1D, the top sheet 134a may emit light below the key cap 124 substantially along light path L2. In some cases, as described above with respect to FIG. 1B, the domed structure 128 may be a transparent structure. In this regard, the domed structure 128 may receive light from the top sheet 234a and transmit the received light to the key cap 124. For example, the domed structure 128 may emit light substantially along light path L3, which may extend through the underside surface 125 and into the key cap 124. This may cause the illuminable surface 126 to illuminate.

FIGS. 2A-4 depict embodiments of the keyboard assembly 108 in which the backlight integrated membrane 132, described herein, is positioned below a feature plate of the keyboard assembly 108 stack-up. This may reduce an overall size and/or thickness of the keyboard assembly 108. The feature plate may include or define various holes, openings, or the like that may be configured to allow the backlight integrated membrane 132 to both light an illuminable portion of the key cap 124 and detect an actuation of the key cap 124.

Figure 2A:
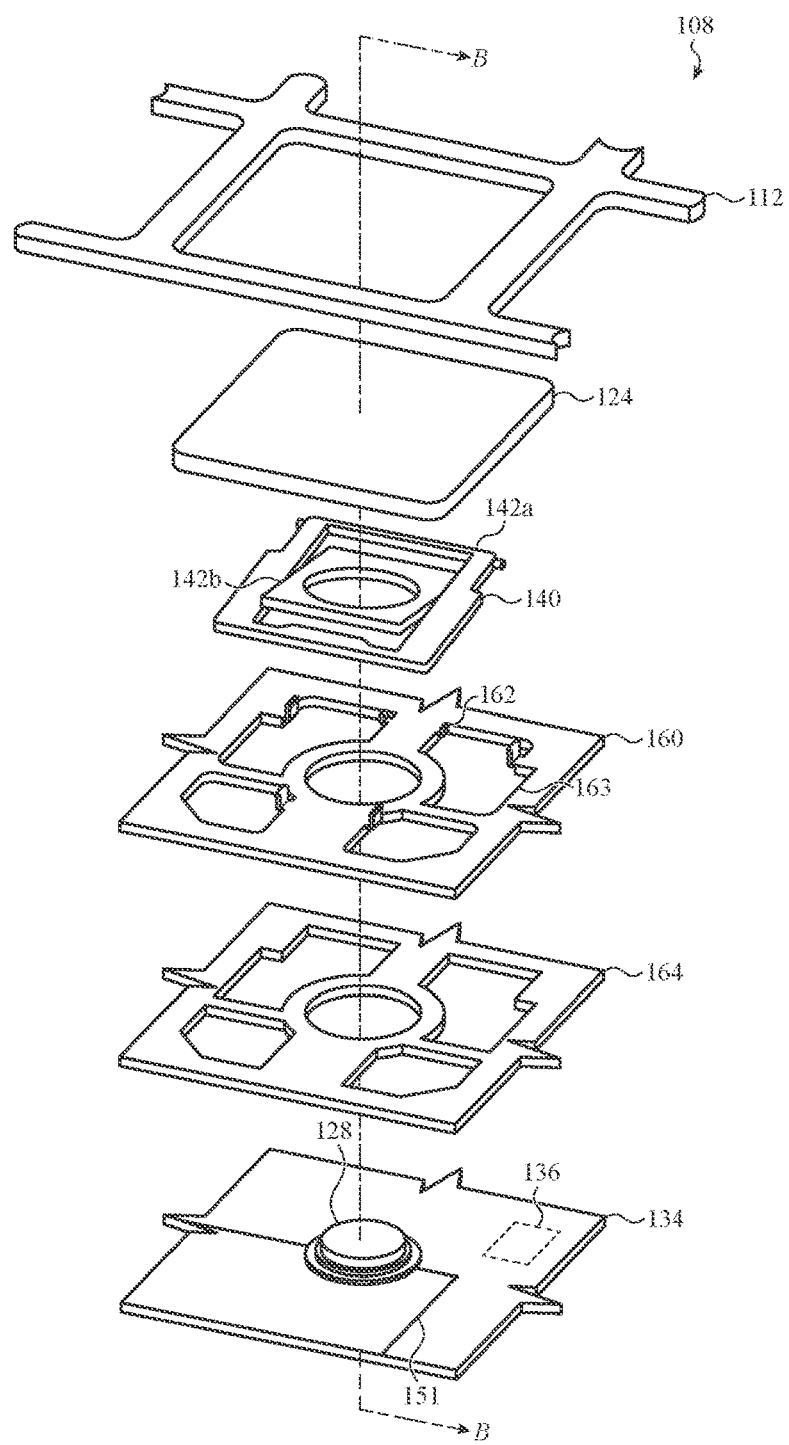
FIG. 2A depicts an exploded view of a keyboard assembly of the keyboard of FIG. 1A.

FIG. 2A depicts an illustrative exploded view of an embodiment of the keyboard assembly 108 shown in FIG. 1A. As described above, the keyboard assembly 108 may be formed from a stack-up of layered components. Each layer and/or component of the stack-up of the keyboard assembly 108 may provide different functionality and/or operations for the electronic device 104, as discussed herein. Although a single key stack-up of keyboard assembly 108 is shown in FIG. 2A, it is understood that substantially all keys (or a subset of keys) of the keyboard assembly 108 may be formed from similar components and/or layers in a similar configuration and/or function in a substantially similar manner as the single key stack-up shown in FIG. 2A.

The keyboard assembly 108 may include the backlight integrated membrane 132, such as the backlight integrated membrane 132 described with respect to FIG. 1B. The backlight integrated membrane 132 may be positioned below a web (defined or formed from the enclosure 112) and the key cap 124. The backlight integrated membrane 132 may be coupled to the web or other portion of the enclosure 112 using various components of stack-up forming the keyboard assembly 108, as described herein.

As described with respect to FIG. 1B, the backlight integrated membrane 132 may be defined by a transparent substrate directly attached and/or optically coupled with the light emitting element 136. This may allow the backlight integrated membrane 132 to direct light to various portions of the keyboard assembly 108 to facilitate lighting an illuminable portion of the key cap 124. The backlight integrated membrane 132 may include electrical traces 151, terminals 150a, 150b (not shown in FIG. 2A), or the like formed therein or thereon; the traces and terminals may be electrically connected to one another. The traces may provide an electrical signal (e.g., input) to electronic device 104 when the domed structure 128 collapses or is otherwise deformed in response to a force exerted on the key cap 124, as discussed herein. The backlight integrated membrane 132 may cover and/or include a geometry substantially equal to an area of the keyboard assembly 108 formed or positioned within the enclosure 112 of the electronic device 104.

As shown in FIG. 2A, the domed structure 128 may be coupled directly to the backlight integrated membrane 132. The domed structure 128 may be laminated, adhered, or otherwise directly affixed to the backlight integrated membrane 132. For example, the domed structure 128 may be positioned in or on a pressure sensitive adhesive, ultraviolet (UV) glue, or other adhesive deposited over a top surface of the backlight integrated membrane 132. The adhesive may be cured to affix the domed structure 128 and the backlight integrated membrane 132. In other cases, the domed structure 128 may be an overmolded component molded over one or more components of the backlight integrated membrane 132.

In the embodiment of FIG. 2A, the keyboard assembly 108 may include a feature plate 160. The feature plate 160 may be a structural portion of the stack-up that defines various engagement features, to which a support structure of the keyboard assembly (e.g., a scissor mechanism, a butterfly mechanism, or the like) may be attached. The feature plate 160 may be constructed substantially from any suitable electrically conductive sheet metal including, but not limited to: aluminum, steel, stainless steel, metal alloys, and so on. Additionally or alternatively, other materials and constructions of the feature plate 160 are contemplated, including embodiments in which the feature plate 160 is constructed from an electrically insulating material, a ceramic, or the like.

In a particular implementation, the feature plate 160 may include a set of engagement features 162 that is configured to couple to a scissor mechanism 140 (or other analogous support structure of the keyboard assembly 108) that is positioned between the feature plate 160 and the key cap 124. As one example, the support structure may be positioned above the feature plate and below the key cap, and engaged with both. The set of engagement features 162 may be tabs, protrusions, or other features extending from a surface of the feature plate 160. In some cases, some or all of the set of engagement features 162 may have holes that are configured to receive, or otherwise couple to, a corresponding engagement structure of, for example, the scissor mechanism 140. This may allow the scissor mechanism 140 to pivot relative to the feature plate 160.

The scissor mechanism 140 may include an outer scissor member 142a and an inner scissor member 142b that pivot relative to one another during actuation of the key cap 124. One or more of the set of engagement features 162 may be partially received by, or otherwise coupled to, the scissor mechanism 140 (e.g., one or both of the outer scissor member 142a or the inner scissor member 142b) and guide motion of the scissor mechanism 140 during actuation of the key cap 124.

The feature plate 160 also includes a set of openings 163. The set of openings 163 may extend completely through the feature plate 160. The set of openings 163 may allow light to pass unobstructed through the feature plate 160. Additionally, the set of openings 163 may be configured to receive one or more components of the keyboard assembly 108 (e.g., the domed structure 128, coupling components, and so on), as described herein.

As shown in FIG. 2A, the backlight integrated membrane 132 is positioned below the feature plate 160. In one embodiment, the backlight integrated membrane 132 may be directly attached to the feature plate 160 via a thermal bonding film 164. The thermal bonding film 164 may be defined by a geometry that is substantially analogous to the geometry of the feature plate 160, including defining holes, openings, or other features corresponding to the set of holes 163 defined by the feature plate 160.

Figure 2B:
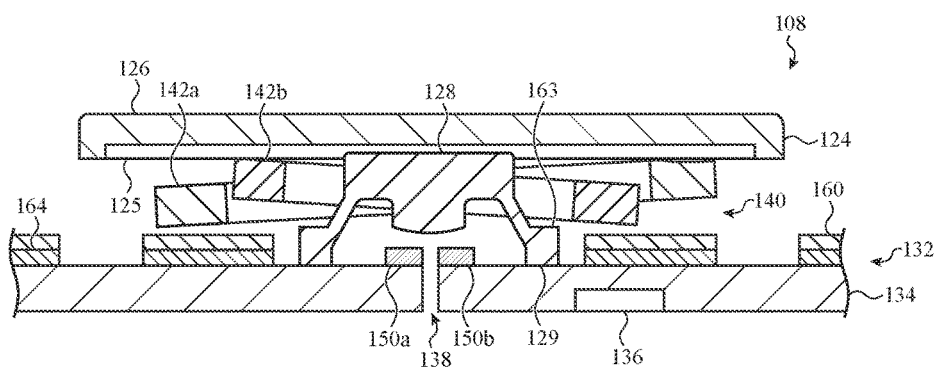
FIG. 2B depicts a cross-sectional view of the keyboard assembly of FIG. 2A, taken along line B-B of FIG. 2A.

As described above, the domed structure 128 may be positioned on or directly attached to the backlight integrated membrane 132. In this regard, in an assembled configuration (as shown in FIG. 2B), the domed structure 128 may extend through the thermal bonding film 164 and the feature plate 160 (via one of the set of holes 163) and toward the key cap 124. This may allow the domed structure 128 to receive a force from an actuation of the key cap 124, notwithstanding the domed structure 128 being directly attached to the backlight integrated membrane 132, which is positioned below the feature plate 160.

FIG. 2B depicts a cross-sectional view of the keyboard assembly 108 of FIG. 2A, taken along line B-B of FIG. 2A. Some of the layers or components of the keyboard assembly 108, for example, the electrical traces 151, have been omitted for clarity. The keyboard assembly 108 depicted in FIG. 2B is shown in an assembled configuration. As such, the domed structure 128 is shown positioned on a surface of the backlight integrated membrane 132 and extending through one of the set of openings 163 and toward the key cap 124.

As shown in the assembled configuration of FIG. 2B, the domed structure 128 may have a periphery 129 that is positioned within an opening 163 of the feature plate 160. This may help support and/or stabilize the domed structure 128 within the keyboard assembly 108. In some cases, the periphery 129 and the feature plate 160 may be separated by a gap or other offset. The periphery 129 of the domed structure 128 may have a thickness that is substantially equivalent to a thickness of the feature plate 160. In other cases, the thickness of the periphery 129 may be smaller or larger than a thickness of the feature plate 160, as may be appropriate for a given application.

As demonstrated in the assembled configuration of FIG. 2B, the keyboard assembly 108 may have a reduced thickness due in part to the domed structure 128 extending through the opening 163 of the feature plate 160. For example, a portion of the domed structure 128 may be nested within a thickness of the feature plate 160. This nesting may help reduce the height of the keyboard. Further, the light guide and the circuit layer of the keyboard assembly 108 are contained within the backlight integrated membrane 132, which further reduces thickness.

In the embodiment of FIG. 2B, the backlight integrated membrane 132 includes a vent 138. The vent 138 may be a through portion that completely extends through the backlight integrated membrane 132. The vent 138 may be positioned within the backlight integrated membrane 132 below the domed structure 128. In this regard, the vent 138 may provide a passage or channel between an enclosed region above the backlight integrated membrane 132 (enclosed by the domed structure 128) and a region or volume positioned below the backlight integrated membrane 132, or may otherwise be in fluid communication with such a region or volume. Accordingly, when the domed structure 128 buckles, collapses, or otherwise deforms in response to an input force exerted on the key cap 124, air enclosed by the domed structure 128 may be expelled through vent 138 and transmitted to another region of the keyboard assembly 108 (e.g., a region positioned below the backlight integrated membrane 132). Positioning the vent 138 directly below the domed structure 128 may also enhance waterproofing features of the keyboard assembly 108. For example, the domed structure 128 and the backlight integrated membrane 132 may form a liquid and/or moisture resistant or impermeable barrier, while still allowing air enclosed below the domed structure 128 to pass through the vent 138 upon actuation of the key cap 124.

As described herein, the backlight integrated membrane 132 may be used to aid in guiding light to an illuminable portion of the key cap 124. As such, as depicted in FIG. 2B, the backlight integrated membrane 132 may include the transparent substrate 134 and the light emitting element 136. Light emitted by the light emitting element 136 may travel through the transparent substrate 134 to light an illuminable portion of the key cap 124. For example, light emitted by the light emitting element 136 may propagate through the transparent substrate 134 and exit at or near one or more of the set of holes 163. In some cases, this may directly illuminate an illuminable portion of the key cap 124 (e.g., such as illuminating a border, surface, corner, or the like of the key cap 124). In other cases, the backlight integrated membrane 132 may be configured to transmit light to the domed structure 128, which may in turn cause an illuminable portion of the key cap 124 to illuminate. For example, the domed structure 128 may be fully or partly formed from a substantially transparent material that is configured to propagate light toward the key cap 124 to illuminate a glyph, symbol, sign, and/or other illuminable portion of the key cap 124. To facilitate such light propagation, the transparent material of the domed structure may be positioned above the transparent membrane and below the key cap.

Figure 3:
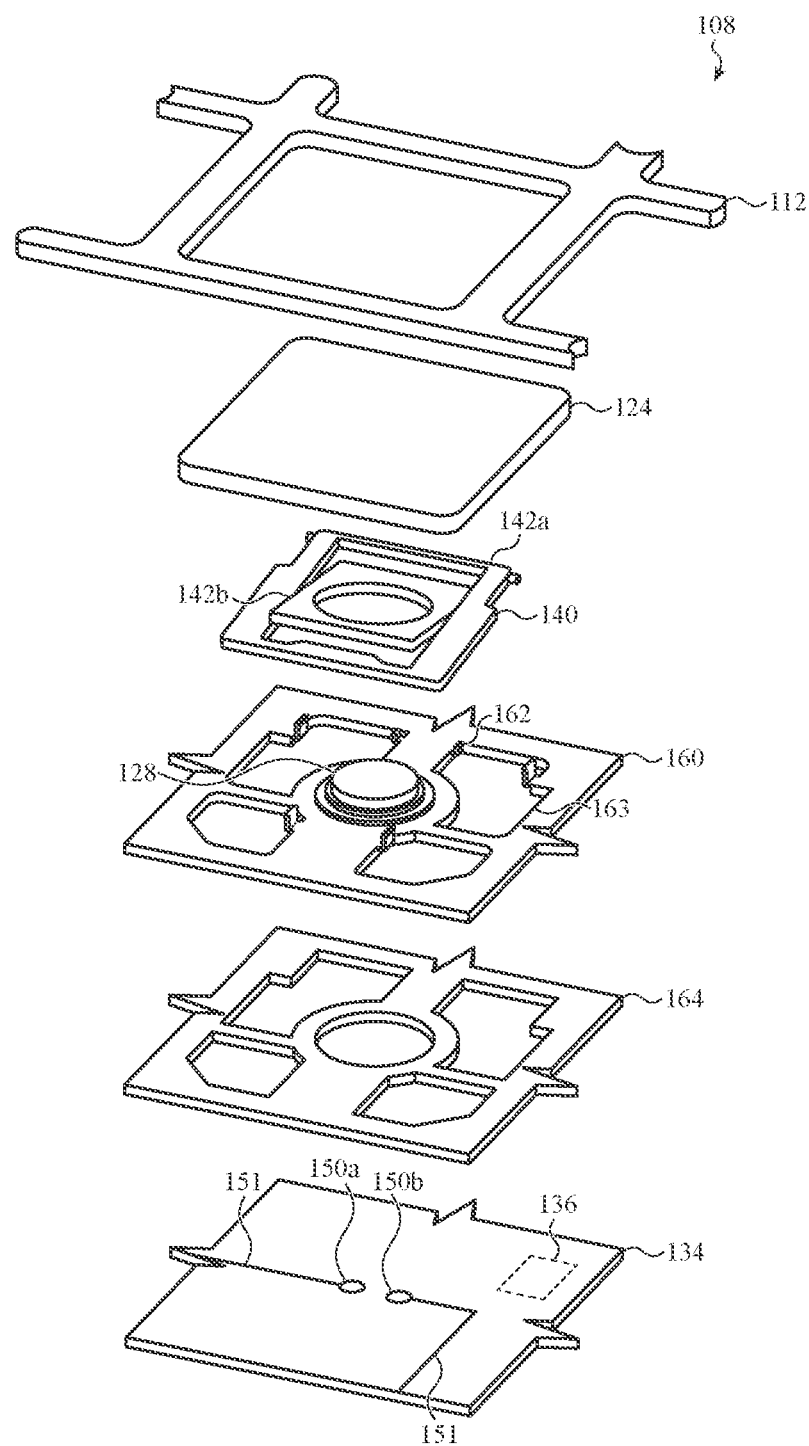
FIG. 3 depicts an exploded view of a keyboard assembly of the keyboard of FIG. 1A having an overmolded domed structure.

FIG. 3 depicts an illustrative exploded view of another embodiment of the keyboard assembly 108 in FIG. 1A. In particular, FIG. 3 depicts an exploded view of the keyboard assembly 108 in a configuration in which the domed structure 128 is directly coupled with the feature plate 160. For example, the domed structure 128 may be an overmolded component that is molded over the feature plate 160. To facilitate the foregoing, the domed structure 128 may be an injection moldable rubber, plastic, or other material that is formed over a surface of the feature plate 160, which may be constructed from steel or other sheet metal material, as described above. This may enhance the manufacturability of the keyboard assembly 108, for example, by decreasing the number of individual components that are used to build the stack-up.

Figure 4:
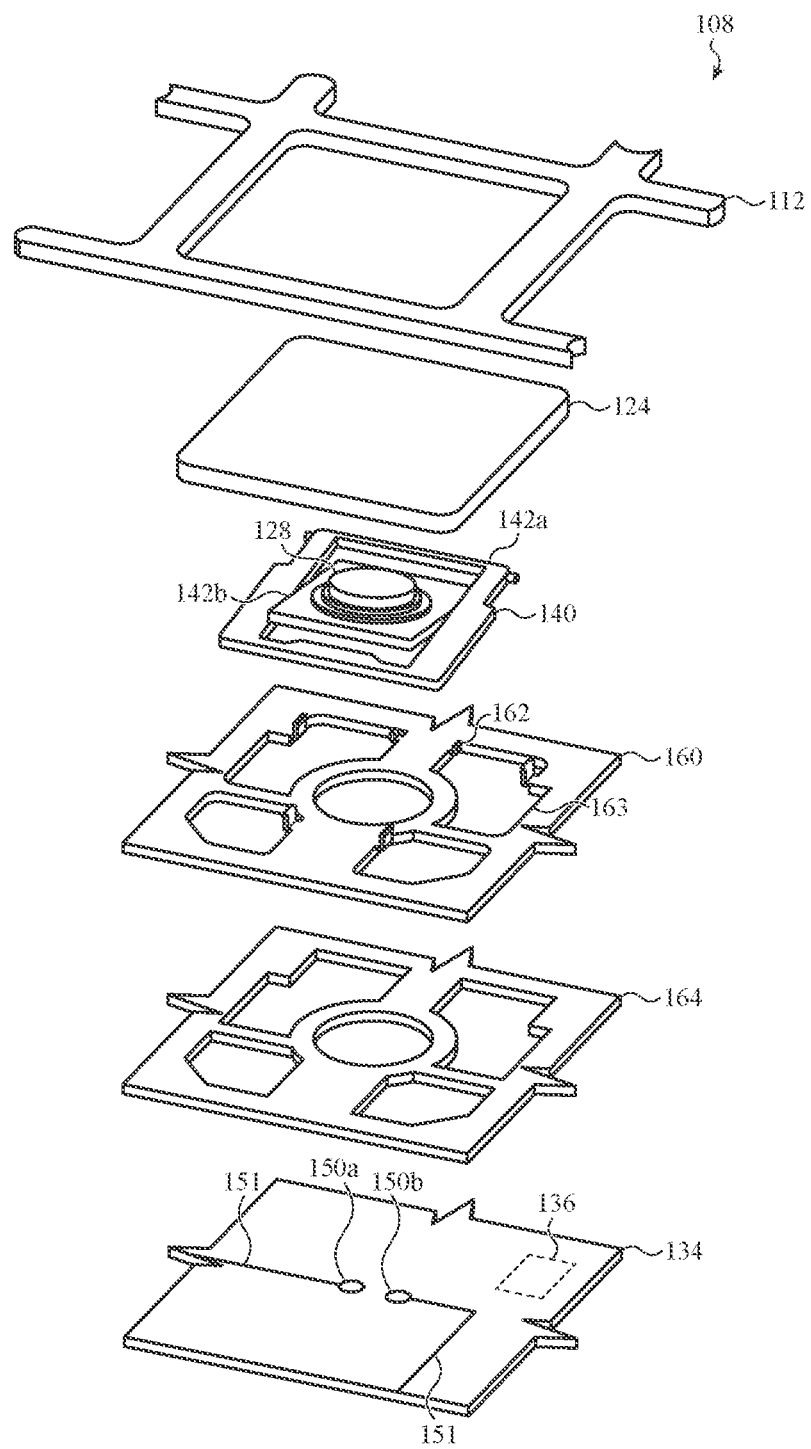
FIG. 4 depicts an exploded view of a keyboard assembly of the keyboard of FIG. 1A having an overmolded domed structure, according to another embodiment.

FIG. 4 depicts an illustrative exploded view of another embodiment of the keyboard assembly 108 in FIG. 1A. In particular, FIG. 4 depicts an exploded view of the keyboard assembly 108 in a configuration in which the domed structure 128 is directly coupled with the inner scissor member 142b. For example, the inner scissor member 142b may be formed from an injection-moldable material that is formed over the periphery 129 of the domed structure 128. Alternatively, the domed structure 128 may be an overmolded component overmolded over a portion of the inner scissor member 142b. In other cases, the domed structure 128 may be co-molded with the inner scissor member 142b.

The domed structure 128 of FIG. 4 may be affixed to the inner scissor member 142b. As described above, the inner scissor member 142b may move or pivot in response to an actuation (e.g., depression) of the key cap 124. In this regard, the domed structure 128 may correspondingly move or pivot along with the inner scissor member 142b. This movement of the domed structure 128 may be configured to produce a predetermined tactile effect at the key cap 124 in response to a user input. For example, the key cap 124 may strike, impact, or otherwise press down on the domed structure 128 of FIG. 4 in a manner that is tactilely distinguishable from other configurations of the keyboard assembly 108 in which the domed structure 128 is substantially stationary during actuation of the key cap 124.

FIGS. 5A-5D depict embodiments of the keyboard assembly 108 in which the backlight integrated membrane 232, described herein with respect to FIG. 1D, is directly coupled with a dome integrated switch housing. The dome integrated switch housing may be used to detect actuation of the key cap 124 and may aid in directing light to an illuminable portion of the key cap 124. The dome integrated switch housing may include an overmolded switch housing that is overmolded over a domed structure 128 (which may be a tactile dome, as one example). This may enhance manufacturability of the keyboard assembly 108, for example, by combining a keyboard switch housing and a domed structure into a single, integrated component.

Figure 5A:
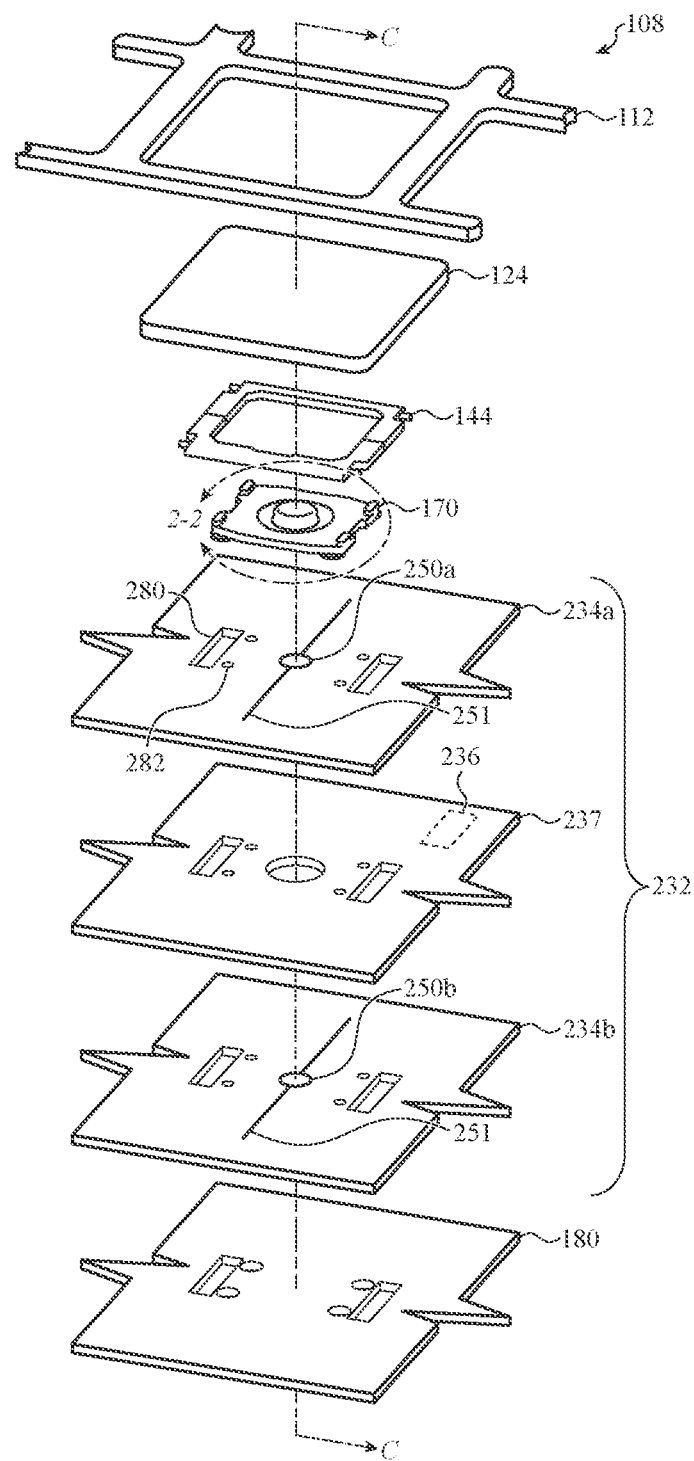
FIG. 5A depicts an exploded view of another embodiment of a keyboard assembly of the keyboard of FIG. 1A.

FIG. 5A depicts an illustrative exploded view of an embodiment of the keyboard assembly 108 shown in FIG. 1A. As described herein, the keyboard assembly 108 may be formed from various layers of components that define a keyboard stack-up. Each layer and/or component of the stack-up of the keyboard assembly 108 may provide different functionality and/or operations for the electronic device 104. Although a single key stack-up of keyboard assembly 108 is shown in FIG. 5A, it is understood that substantially all keys (or a subset of keys) of the keyboard assembly 108 may be formed from similar components and/or layers in a similar configuration and/or function in a substantially similar manner as the single key stack-up shown in FIG. 5A.

The keyboard assembly 108 may include the backlight integrated membrane 232, such as the backlight integrated membrane 232 described with respect to FIG. 1D. In the embodiment shown in FIG. 5A, the backlight integrated membrane 232 may include top sheet 234a, bottom sheet 234b, membrane spacer 237, and light emitting element 236. As described above, the top sheet 234a, the bottom sheet 234b, and the membrane spacer 237 may cooperate to define a keyboard membrane circuit that initiates an input in response to a force exerted on the key cap 124. For example, the top sheet 234a may be coupled with the terminals 250a and the bottom sheet 234b may be coupled with the terminal 250b. The terminals 250a, 250b may complete an electrical circuit when the domed structure 128 collapses (or otherwise deforms) in response to an input force exerted on the key cap; this collapse forces the terminals 250a, 250b into physical contact and electrical connection with one another. The top and bottom sheets 234a, 234b may include electrical traces 251, which may be used to transmit an electrical signal to a computing device when the circuit is completed. One or both of the top sheet 234a and the bottom sheet 234b may be transparent and aid in providing light to an illuminable portion of the key cap 124. For example, one or both of the top sheet 234a or the bottom sheet 234b may propagate light received from the light emitting element 236 toward the illuminable portion of the key cap 124.

The backlight integrated membrane 232 may be positioned below a web (defined or formed from the enclosure 112) and the key cap 124. The backlight integrated membrane 232 may be coupled to and/or rest on a reflective component 180; for example, the reflective component 180 may be directly adhered to a bottom surface of the backlight integrated membrane 232, or otherwise directly connected or affixed to the membrane. In some embodiments, the reflective component 180 may be a portion of the backlight integrated membrane 232, or a reflective ink or other material applied to the membrane.

The reflective component 180 may have light reflective properties and may be configured to redirect stray light back into the backlight integrated membrane 232 or other component of the keyboard assembly 108. More specifically, light generated by the light emitting element 236 may stray below one or both of the top sheet 234a or the bottom sheet 234b. As a result of the light-reflective properties of the reflective component 180, such stray light may be reflected back into the backlight integrated membrane 232, through which the light may be subsequently redirected to an illuminable portion of the key cap 124. The reflective component 180 may be constructed from a variety of substantially reflective materials including, but not limited to, stainless steel, aluminum, and/or other metallic or non-metallic components having substantially reflective properties.

The backlight integrated membrane 232 may be positioned below, and coupled with, a dome integrated switch housing 170. The dome integrated switch housing 170 may be a structural portion of the keyboard assembly 108 that contains a deformable tactile dome or other domed structure used to detect actuation of the key cap 124. The dome integrated switch housing 170 may also include various light extraction or illumination features that may direct light to an illuminable portion of the key cap 124.

As shown in FIG. 5A, the dome integrated switch housing 170 may be coupled with a butterfly mechanism 144 or other analogous support structure of the keyboard assembly 108. The dome integrated switch housing 170 may support the key cap 124 using, for example, the butterfly mechanism 144 or other support structure of the keyboard assembly 108. For example, the butterfly mechanism 144 may be pivotally connected to both of the dome integrated switch housing 170 and the key cap 124. The butterfly mechanism 144 may pivot during actuation of the key cap 124 such that the key cap 124 remains structurally supported above the backlight integrated membrane 232 during actuation of the key cap 124. In this regard, the dome integrated switch housing 170 may be a structural component of the keyboard assembly 108 that facilitates securing the key cap 124 above the backlight integrated membrane 232. Additionally or alternatively, as described with respect to FIG. 5B, the dome integrated switch housing 170 may include one or more posts 177 that extend from a top surface of the dome integrated switch housing 170 and provide a stop or cushion to the key cap 124 when the key cap 124 is sufficiently depressed. As such, the dome integrated switch housing 170 may support the key cap 124 through contact with the posts 177 or other features of the dome integrated switch housing 170.

The backlight integrated membrane 232 may include various recesses, openings, or other features that are configured to secure and/or receive components of the keyboard assembly 108. For example, the backlight integrated membrane 232 may include recesses 280 that extend through one or more of the top sheet 234a, the membrane spacer 237, and the bottom sheet 234b. In some cases, the recesses 280 may extend through the reflective component 180 as well. The recesses 280 may be configured to receive a pivoting joint or portion of the butterfly mechanism 144. This may help reduce the height of the keyboard assembly 108 by partially nesting the butterfly mechanism within the backlight integrated membrane 232. The backlight integrated membrane 232 may also include mounting holes 282. The mounting holes 282 may extend through one or more of the top sheet 234a, the membrane spacer 237, the bottom sheet 234b, and/or the reflective component 180. The mounting holes 282 may define mounting features at which the dome integrated switch housing 170 may be mounted to the backlight integrated membrane 232.

Figure 5B:
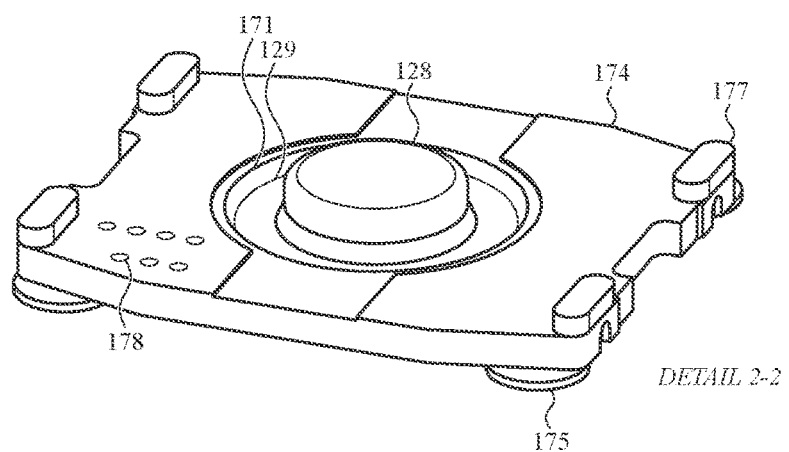
FIG. 5B depicts an enlarged view of a dome integrated switch housing of the keyboard assembly of FIG. 4A.

FIG. 5B depicts detail 2-2 of the dome integrated switch housing 170 depicted in FIG. 5A. As shown in the non-limiting example of FIG. 5B, the dome integrated switch housing 170 may include an overmolded switch housing 174 and the domed structure 128. The overmolded switch housing 174 may be an overmolded component that is overmolded over a portion of the domed structure 128 (e.g., such as about a periphery 129 of the domed structure 128). In some cases, the overmolded switch housing 174 may have a hardness that is greater than a hardness of the domed structure 128.

More generally, the overmolded switch housing 174 may be a structural component of the keyboard assembly 108. For example, the overmolded switch housing 174 may structurally support the domed structure 128 within the keyboard assembly 108. For example, the overmolded switch housing 174 may include or define feet 175, as depicted in FIG. 5B. The feet 175 may be configured to be secured to or received by the backlight integrated membrane 232 (e.g., the feet 175 may be received by the mounting holes 282, described with respect to FIG. 5A).

Further the overmolded switch housing 174 may also serve to enhance the acoustic performance of the keyboard assembly 108. In an embodiment, the overmolded switch housing 174 may include posts 177. The posts 177 may be constructed from rubber or other acoustically insulating materials. The posts 177 may extend from a top surface of the overmolded switch housing 174. The posts 177 may have a height or other dimension such that the key cap 124 impacts the posts 177 upon actuation. This may help dampen the sound associated with a key stroke.

The overmolded switch housing 174 may also include or define various light extraction features 178. As explained in greater detail below with respect to FIG. 5C, the light extraction features 178 may be configured to receive light from the backlight integrated membrane 232. In this regard, the overmolded switch housing 174 may be used to illuminate an illuminable portion of the key cap 124.

Further, the domed structure 128 and the overmolded switch housing 174 may form an interface within the dome integrated switch housing 170 in any appropriate manner. In some cases, as shown in FIG. 5B, the dome integrated switch housing 170 may include a collar 171 between the domed structure 128 and the overmolded switch housing 174. As explained in greater detail below with respect to FIG. 5C, the collar 171 may be configured to reduce stress and strain within the domed structure 128 over time.

Figure 5C:
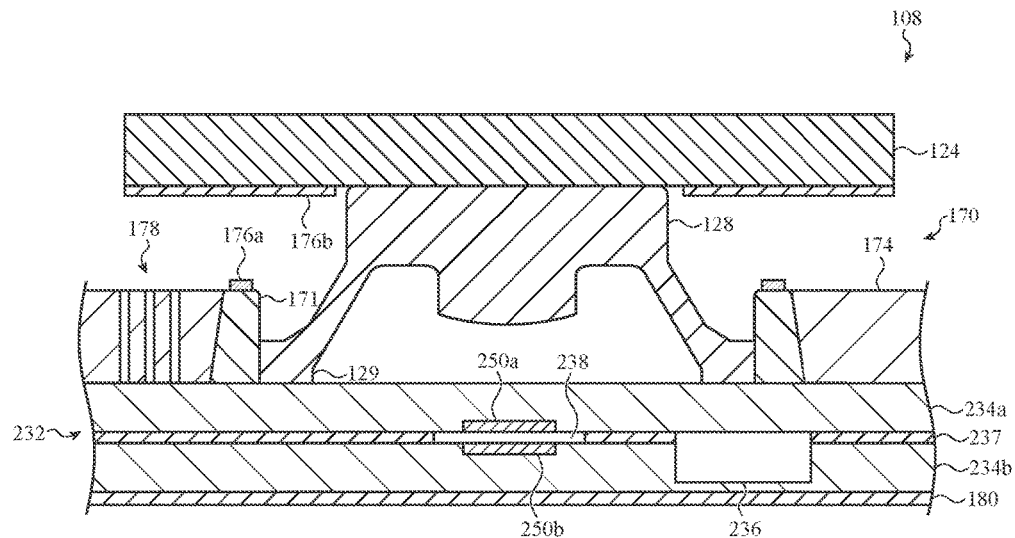
FIG. 5C depicts a cross-sectional view of the keyboard assembly of FIG. 5A, taken along line C-C of FIG. 5A.

FIG. 5C depicts a cross-sectional view of the keyboard assembly 108 of FIG. 5A, taken along the line C-C of FIG. 5A. Some of the layers or components of the keyboard assembly 108, for example, the electrical traces 251, have been omitted for clarity. The keyboard assembly 108 depicted in FIG. 5C is shown in an assembled configuration. As such, the dome integrated switch housing 170 is shown positioned on a surface of the backlight integrated membrane 232.

As demonstrated above, the dome integrated switch housing 170 may include light extraction features 178. The light extraction features 178 may be optically coupled with the backlight integrated membrane 232 such that the light extraction features 178 receive light from the light source 236. The light extraction features 178 may be apertures, transparent sections, and/or other regions of the dome integrated switch housing 170 that are configured to propagate light within the keyboard assembly 108. The light extraction features 178 are shown in FIG. 5C as extending through the dome integrated switch housing 170 at the overmolded switch housing 174. However, it will be appreciated that the light extraction features 178 may be positioned at the domed structure 128 and/or any other appropriate position or orientation with the dome integrated switch housing 170, including embodiments in which the light extraction features 178 are positioned at least partially within the overmolded switch housing 174 and the domed structure 128.

The dome integrated switch housing 170 may be constructed in a manner that reduces stress and strain on the domed structure 128 over time. For example, a collar 171 may be defined about the periphery 129 of the domed structure 128. The collar 171 may be an integral or unitary component of the domed structure 128, the overmolded switch housing 174, and/or may be a separate overmolded component of the dome integrated switch housing 170.

In one embodiment, the collar 171 may reduce stress and strain within the domed structure 128 when the key cap 124 is depressed. For example, depression of the key cap 124 may cause an upper portion of the domed structure 128 to translate and deform until the domed structure 128 buckles (e.g., collapses). Continued depression of the key cap 124 may create an overloaded condition in which the domed structure 128 bows, collapses, or extends in a direction transverse to the depression of the key cap 124. The collar 171 may resist collapse or other deformation of the domed structure 128 when it is in the overloaded condition. For example, the collar 171 may physically obstruct deformation or collapse of the domed structure 128 beyond a predetermined point due to the abutment or positioning of the collar 171 about the periphery 129. It will be appreciated that the collar 171 may have any appropriate physical attributes (e.g., rigidity, thickness, height, and so on) to resist deformation of the domed structure 128 in an overloaded condition.

The dome integrated switch housing 170 may also be used with various sensing elements that are configured to detect a range of deformations of the domed structure 128 (up to, and including, collapse). For example, the keyboard assembly 108 may include a sense layer 176a positioned on a surface of the dome integrated switch housing 170 and a drive layer 176b positioned on a surface of the key cap 124. The sense layer 176a and the drive layer 176b may collectively define an input or sensing element or structure that is configured to detect a translation and/or deformation of the domed structure 128 and/or the key cap 124.

In one embodiment, the sense layer 176a and the drive layer 176b may be a pair of capacitive electrodes. In this manner, a capacitance between the sense layer 176a and the drive layer 176b may vary with a distance separating the sense layer 176a and the drive layer 176b. Thus, a change in capacitance may be measured and correlated with, for example, a depression of the key cap 124 or similar input surface. When the change in capacitance exceeds a threshold, the keyboard assembly 108 may initiate a switch event (that is, generate an input signal). Additionally or alternatively, the capacitance may be associated with a range of non-binary inputs, including associated with a change in capacitance with a force received at the key cap 124 (e.g., by determining a force required to displace the domed structure 128 by an amount associated with a change in distance between the sense layer 176a and the drive layer 176b).

In this regard, the sense layer 176a, the drive layer 176b (or any other suitable sensing element), and the backlight integrated membrane 232 may cooperate to detect multiple deformations of the domed structure 128. As one example, electrical traces on the backlight integrated membrane 132 may be electrically connected by a first deformation of the domed structure 128, which may correspond to an initial collapsing or buckling of the domed structure 128. The sense layer 176a and the drive layer 176b may operate to detect a second deformation of the domed structure 128, as described above, which may correspond to a subsequent deformation of the domed structure 128.

As demonstrated by the assembled configuration of FIG. 5C, the keyboard assembly 108 may have a reduced thickness, due in part to the domed structure 128 being positioned within the overmolded switch housing 174. For example, a portion of the domed structure 128 may be nested within a thickness of the overmolded switch housing 174. This nesting may help reduce the height of the keyboard. Further, the light guide and the circuit layer of the keyboard assembly 108 are included within the backlight integrated membrane 232, which further reduces thickness.

Figure 5D:
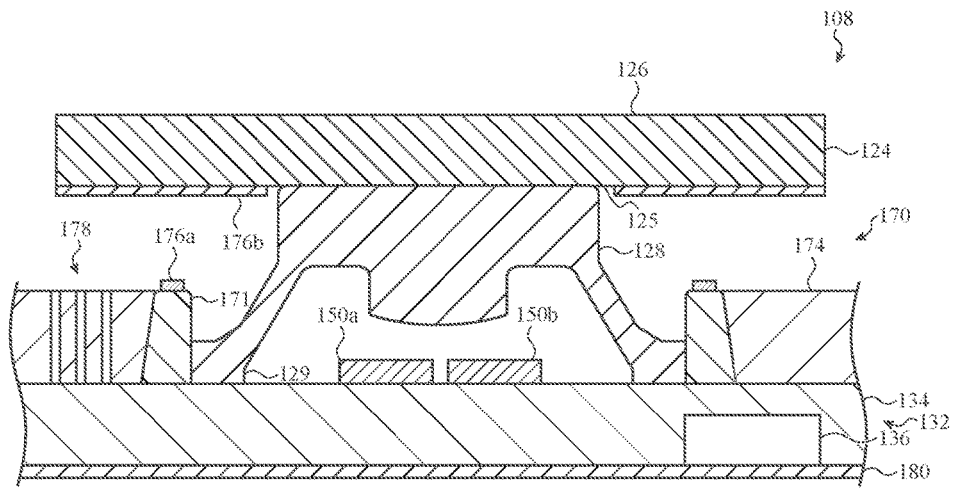
FIG. 5D depicts a cross-sectional view of another embodiment of the keyboard assembly of FIG. 5A, taken along line C-C of FIG. 5A.

FIG. 5D depicts a cross-sectional view of another embodiment of the keyboard assembly 108 of FIG. 5A, taken along line C-C of FIG. 5A. Some of the layers or components of the keyboard assembly 108, for example, the electrical traces 151, have been omitted for clarity. In particular, in the embodiment of FIG. 5D, the dome integrated switch housing 170 is shown coupled with the backlight integrated membrane 132, described with respect to FIGS. 1B and 2A-4. In this regard, the backlight integrated membrane 132 may be configured to detect actuation of the key cap 124 using the domed structure 128 as overmolded or contained within the overmolded switch housing 174. Additionally, the backlight integrated membrane 132 may be configured to illuminate an illuminable portion of the key cap 124, such as illuminable surface 126, using the dome integrated switch housing 170.

Figure 5E:
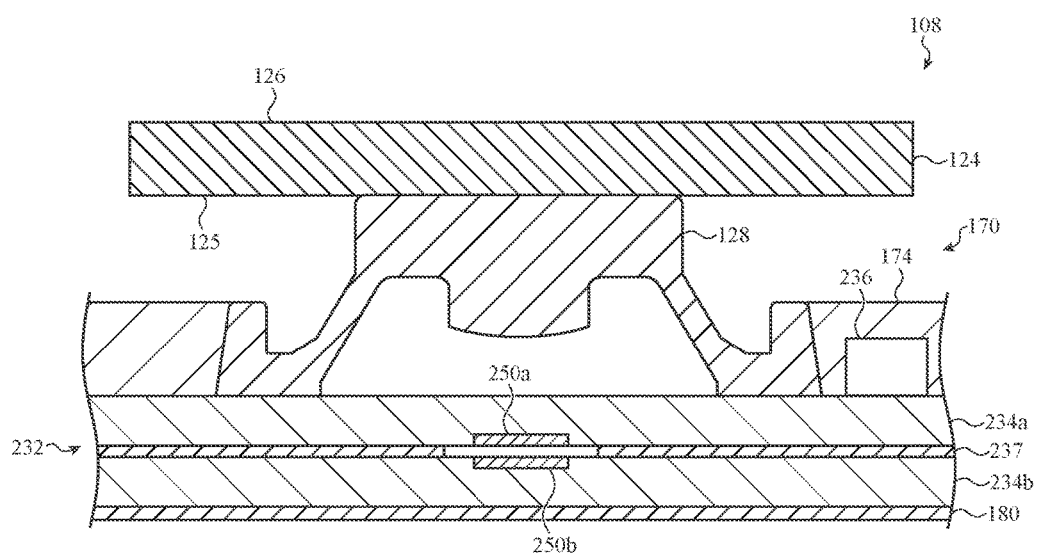
FIG. 5E depicts a cross-sectional view of another embodiment of the keyboard assembly of FIG. 5A, taken along line C-C of FIG. 5A.

FIG. 5E depicts a cross-sectional view of another embodiment of the keyboard assembly 108 of FIG. 5A, taken along line C-C of FIG. 5A. Some of the layers or components of the keyboard assembly 108, for example, the electrical traces 251, have been omitted for clarity. In particular, in the embodiment of FIG. 5E, the light emitting element 236 is shown positioned on a surface of the top sheet 234*a*. For example, the light emitting element 236 may be positioned on a lateral surface of the top sheet 234*a* and below the key cap 124 or other input surface. The light emitting element 236 may be optically coupled with the top sheet 234*a* such that the backlight integrated membrane 232 may direct light to various regions within the keyboard assembly 108.

In some cases, as shown in FIG. 5E, the light emitting element 236 may be positioned within, beneath, or formed as a component of, the dome integrated switch housing 170. For example, the light emitting element 236 may be positioned within a volume defined by the overmolded switch housing 174 (e.g., beneath the housing). In this regard, the dome integrated switch housing 170 may receive light directly from the light emitting element 236. In turn, the dome integrated switch housing 170 may propagate the light received from the light emitting element 236 to various regions of the keyboard assembly 108, which may facilitate or cause an illuminable portion of the key cap 124 to illuminate. To facilitate the foregoing, at least a portion of the dome integrated switch housing 170 (including portions of the domed structure 128 and/or the overmolded switch housing 174) may be made of a transparent material.

Other examples and implementations are within the scope and spirit of the disclosure and appended claims. For example, features implementing functions may also be physically located at various positions, including being distributed such that portions of functions are implemented at different physical locations. Similarly, although embodiments have been discussed in the context of keys of a keyboard, other input mechanisms may incorporate or form embodiments described herein. As an example, trackpads, mice, buttons, touch-sensitive surfaces, and the like may all incorporate structures and/or methods of operation described herein. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A key for a keyboard, comprising:
a key cap;
a feature plate positioned below the key cap;
a backlight integrated membrane positioned below the feature plate and comprising:
 a light emitting element;
 a transparent substrate optically coupled to the light emitting element; and
 electrical traces disposed on the transparent substrate;
a first terminal and second terminal on the transparent substrate and electrically connected to the electrical traces;
a domed structure positioned on the backlight integrated membrane above the first terminal and second terminal, the domed structure configured to collapse and thereby electrically connect the first terminal and second terminal;
a switch housing positioned below the keycap and having an opening positioned peripherally around the domed structure; and
a collar disposed about a periphery of the domed structure and abutting the opening of the feature plate, the collar resisting deformation of a portion of the domed structure upon its collapse.

2. The key of claim 1, wherein:
the key cap is positioned within an opening of an enclosure and at least partially protrudes from the enclosure;
the key cap includes an illuminable surface;
the backlight integrated membrane directs light to the illuminable surface from the light emitting element;
the key further comprises a support structure positioned below the key cap;
the feature plate includes a set of engagement features; and
the support structure is coupled to the set of engagement features and an underside of the key cap.

3. The key of claim 1, wherein:
the domed structure comprises a transparent material positioned above the transparent substrate and below the key cap.

4. The key of claim 3, wherein the light emitting element is positioned beneath the domed structure and is at least partially surrounded by the transparent substrate.

5. The key of claim 1, wherein:
the feature plate defines a hole; and
the domed structure extends through the hole.

6. The key of claim 5, wherein a periphery of the domed structure is separated from the feature plate by the collar.

7. The key of claim 6, wherein a thickness of the collar is approximately equal to a thickness of the feature plate.

8. The key of claim 1, wherein:
the backlight integrated membrane defines a vent positioned under the domed structure; and the vent is in fluid communication with an interior volume of the domed structure.

9. The key of claim 1, further comprising a thermal bonding film directly adhered to the feature plate and the backlight integrated membrane.

10. The key of claim 1, further comprising a reflective component directly adhered to a bottom surface of the backlight integrated membrane.

11. An input mechanism, comprising:
an input surface operative to receive an input;
a domed structure operative to collapse in response to the input;
a switch housing overmolded over at least part of the domed structure, at least a portion of the switch housing being transparent, the input surface being movable relative to the switch housing;
a transparent substrate positioned under the switch housing;
electrical traces on the transparent substrate, the electrical traces operative to transmit a signal generated by the domed structure; and
a light emitting element optically coupled to the transparent substrate; wherein
the transparent substrate redirects light from the light emitting element to the input surface.

12. The input mechanism of claim 11, wherein the input surface is a key cap of a keyboard key.

13. The input mechanism of claim 11, wherein the transparent substrate propagates light received from the light emitting element to an illuminable portion of the input surface.

14. The input mechanism of claim 13, wherein:
the switch housing includes light extraction features that receive light from at least one of:
the transparent substrate; or
the light emitting element; and
the switch housing illuminates the illuminable portion of the input surface using light received from the light extraction features.

15. The input mechanism of claim 11, wherein:
an upper portion of the domed structure deforms in response to an input force exerted on the input surface;
a periphery of the domed structure defines a collar; and
the collar resists deformation of the upper portion once the upper portion impacts the collar.

16. The input mechanism of claim 11, wherein:
the electrical traces are connected upon a first deformation of the domed structure; and
the input mechanism further comprises a sensing element that detects a second deformation of the domed structure.

17. An input structure for an electronic device, comprising:
a light emitting element;
a backlight integrated membrane comprising a layer at least partially surrounding the light emitting element;
terminals on the backlight integrated membrane;
a housing structure on the backlight integrated membrane;
a domed structure positioned on the backlight integrated membrane at least partially within the housing structure and about the terminals; and
a key cap positioned above the domed structure and having an illuminable portion, wherein:
the layer defines a light guide that directs light through the domed structure and toward the illuminable portion of the key cap; and
a vent extending through the layer and positioned below the domed structure.

18. The input structure of claim 17, wherein:
the backlight integrated membrane further comprises an optical filler positioned between the light emitting element and the light guide; and
the optical filler optically couples the light emitting element and the light guide.

19. The input structure of claim 17, wherein:
the housing structure defines light extraction features optically coupled with the light guide; and
the light guide directs light toward the illuminable portion of the key cap through the light extraction features.

20. The input structure of claim 17, wherein:
the input structure further comprises:
a feature plate; and
a scissor mechanism pivotally coupled with the feature plate and the key cap; and
the domed structure is overmolded over one of:
the feature plate; or
the scissor mechanism.

* * * * *